United States Patent
Park

(10) Patent No.: US 10,066,952 B2
(45) Date of Patent: Sep. 4, 2018

(54) SAFE DRIVING INDUCEMENT METHOD AND PROGRAM AND NAVIGATION TERMINAL, SERVER AND COMPUTER READABLE RECORDING MEDIUM FOR EXECUTING THE SAME

(71) Applicant: Hyundai Motor Company, Seoul (KR)

(72) Inventor: Sung Woo Park, Seoul (KR)

(73) Assignee: Hyundai Motor Company, Seoul (KR)

(*) Notice: Subject to any disclaimer, the term of this patent is extended or adjusted under 35 U.S.C. 154(b) by 0 days.

(21) Appl. No.: 14/939,919

(22) Filed: Nov. 12, 2015

(65) Prior Publication Data

US 2017/0045367 A1 Feb. 16, 2017

(30) Foreign Application Priority Data

Aug. 14, 2015 (KR) .................. 10-2015-0114998

(51) Int. Cl.
| | |
|---|---|
| G01C 22/00 | (2006.01) |
| G05D 1/00 | (2006.01) |
| G01C 21/34 | (2006.01) |
| G01C 21/36 | (2006.01) |
| H04W 4/021 | (2018.01) |
| G01C 21/20 | (2006.01) |

(Continued)

(52) U.S. Cl.
CPC ......... *G01C 21/3461* (2013.01); *G01C 21/20* (2013.01); *G01C 21/3664* (2013.01); *G01C 21/3667* (2013.01); *G01C 21/3697* (2013.01); *H04W 4/021* (2013.01); *H04W 4/046* (2013.01); *G08G 1/207* (2013.01)

(58) Field of Classification Search
CPC . G01C 21/20; G01C 21/3664; G01C 21/3667

USPC .......................................................... 701/428
See application file for complete search history.

(56) References Cited

U.S. PATENT DOCUMENTS

| | | | |
|---|---|---|---|
| 2006/0200305 A1 | 9/2006 | Sheha et al. | |
| 2008/0082253 A1* | 4/2008 | Oguchi .............. | G01C 21/3461 |
| | | | 701/533 |

FOREIGN PATENT DOCUMENTS

| | | |
|---|---|---|
| EP | 1760432 A2 | 3/2007 |
| EP | 1796057 A1 | 6/2007 |
| JP | 2001-052300 A | 2/2001 |

(Continued)

OTHER PUBLICATIONS

European Search Report for European Patent Application No. 15196521.7, dated Jan. 9, 2017, 11 pages.

*Primary Examiner* — Maceeh Anwari
(74) *Attorney, Agent, or Firm* — Mintz Levin Cohn Ferris Glovsky and Popeo, P.C.; Peter F. Corless

(57) ABSTRACT

A navigation terminal for a vehicle includes: a boundary information acquisition unit acquiring at least one piece of boundary information, representing a boundary of a geofence, on a map; a path search unit searching for progress paths between a current position of the vehicle displayed on the map and the at least one piece of boundary information; a cross point calculation unit calculating a road cross point on at least one identified progress path, connected to the at least one piece of boundary information, based on a degree of proximity of the at least one identified progress path to the at least one piece of boundary information; and a warning issue unit outputting a warning when it is sensed that the vehicle is approaching the calculated road cross point.

12 Claims, 5 Drawing Sheets

(51) Int. Cl.
*H04W 4/04* (2009.01)
*G08G 1/00* (2006.01)

(56) References Cited

FOREIGN PATENT DOCUMENTS

| | | | |
|---|---|---|---|
| JP | 2011-133427 A | | 7/2011 |
| JP | 2012-127708 A | | 7/2012 |
| JP | 2012-233792 A | | 11/2012 |
| KR | 10-2010-0052324 A | | 5/2010 |
| KR | 10-0982219 B1 | | 9/2010 |
| KR | 2010-0118875 A | | 11/2010 |
| KR | 20100118875 A | * | 11/2010 |
| KR | 2014-0020576 A | | 2/2014 |
| KR | 10-2014-0090213 A | | 7/2014 |
| WO | 2014/118529 A1 | | 8/2014 |

* cited by examiner

SAFE DRIVING INDUCEMENT METHOD AND PROGRAM AND NAVIGATION TERMINAL, SERVER AND COMPUTER READABLE RECORDING MEDIUM FOR EXECUTING THE SAME

CROSS-REFERENCE TO RELATED APPLICATION

This application claims the benefit of and priority to Korean Patent Application No. 10-2015-0114998, filed on Aug. 14, 2015, which is hereby incorporated by reference as if fully set forth herein.

BACKGROUND OF THE DISCLOSURE

Field of the Disclosure

The present disclosure relates generally to path search technology for vehicles, and more particularly, to a safe driving inducement method and program for effectively providing geo-fence related path search and a navigation terminal, server and computer readable recording medium for executing the same.

Discussion of the Related Art

Geo-fence technology is technology in which, if a vehicle deviates from a geographic area predetermined by a user, position information of the vehicle at the outside of the area is stored, and the user is informed of violation of the vehicle deviating from the area based on the stored position information. The geo-fence technology thus allows a driver to preliminarily recognize a predetermined area and induces the driver to not deviate from the protection area.

However, in conventional geo-fence technology, a geo-fence region predetermined by a user is not preliminarily known to drivers, and thus, there are no such prevention effects. Further, a warning alarm is issued only if a vehicle deviates from the geo-fence region on a map. Thus, effects of preventing preliminary violations are not carried out.

SUMMARY OF THE DISCLOSURE

Accordingly, the present disclosure is directed to a safe driving inducement method and program and a navigation terminal, server and computer readable recording medium for executing the same that substantially obviate one or more problems due to limitations and disadvantages of the related art.

An object of the present disclosure is to provide a safe driving inducement method and program for preliminary informing of the position of a cross road nearest to a road located in a boundary region of a geo-fence before a vehicle enters the cross road, and a navigation terminal, server and computer readable recording medium for executing the same. Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, a safe driving inducement method includes: a boundary information acquisition unit acquiring at least one piece of boundary information, representing a boundary of a geo-fence, on a map; a path search unit searching for progress paths between a current position of the vehicle displayed on the map and the at least one piece of boundary information; a cross point calculation unit calculating a road cross point on at least one identified progress path, connected to the at least one piece of boundary information, based on a degree of proximity of the at least one identified progress path to the at least one piece of boundary information; and a warning issue unit outputting a warning when it is sensed that the vehicle is approaching the calculated road cross point.

The boundary information may include road boundary information passing through boundary points of the geo-fence and geographical boundary information neighboring the road boundary information.

The boundary information acquisition unit may include: a boundary information storage unit storing the boundary information including the road boundary information and the geographical boundary information; and a boundary information extraction unit extracting the road boundary information from the stored boundary information.

The path search unit may search for progress paths between the current position of the vehicle and the extracted road boundary information.

The cross point calculation unit may calculate a first road cross point extending inwardly from the road boundary information.

When a distance between the current position of the vehicle and the road cross point is within a predetermined distance range, the warning issue unit may determine that a risk state exists and outputs the warning.

The warning may include at least one of a message warning displayed on a road, on which the vehicle travels, on the map and a voice warning outputted through a speaker of the vehicle.

Each of the boundary information, the current position of the vehicle, and the road cross point may include coordinate values including latitude and longitude.

Furthermore, according to embodiments of the present disclosure, there is provided a program stored in a recording medium for performing the safe driving inducement method executed by a processor. Furthermore, there is provided a computer readable recording medium in which the program is recorded.

Furthermore, according to embodiments of the present disclosure, a navigation terminal includes: a memory configured to store at least one program; and a processor configured to execute the at least one stored program, wherein when the processor executes the at least one stored program, the processor: acquires at least one piece of boundary information, representing a boundary of a geo-fence, on a map, searches for progress paths between a current position of the vehicle displayed on the map and the at least one piece of boundary information, calculates a road cross point on at least one identified progress path, connected to the at least one piece of boundary information, based on a degree of proximity of the at least one identified progress path to the at least one piece of boundary information, and outputs a warning when it is sensed that the vehicle is approaching the calculated road cross point.

Furthermore, according to embodiments of the present disclosure, a navigation server includes: an information reception unit receiving at least one piece of boundary information, representing a boundary of a geo-fence, from a navigation terminal and receiving a current position of a vehicle from a global positioning system (GPS); a path search unit searching for progress paths between the current position of the vehicle displayed on a map and the at least one piece of boundary information; a cross point calculation unit calculating a road cross point on at least one identified progress path, connected to the at least one piece of boundary information, based on a degree of proximity of the at least one identified progress path to the at least one piece of boundary information; a warning generation unit generating warning information when it is sensed that the vehicle is approaching the calculated road cross point; and an information transmission unit transmitting the at least one piece of boundary information, the current position of the vehicle, the at least one identified progress path, and the calculated road cross point to the navigation terminal in real-time by applying the at least one piece of boundary information, the current position of the vehicle, the at least one identified progress path, and the calculated road cross point to the map, and transmitting the generated warning information to the navigation terminal.

The boundary information may include road boundary information passing through boundary points of the geo-fence and geographical boundary information neighboring to the road boundary information.

The cross point calculation unit may calculate a first road cross point extending inwardly from the road boundary information.

When a distance between the current position of the vehicle and the road cross point is within a predetermined distance range, the warning generation unit may determine that a risk state exists and generate the warning.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION OF THE DISCLOSURE

Figure 1:
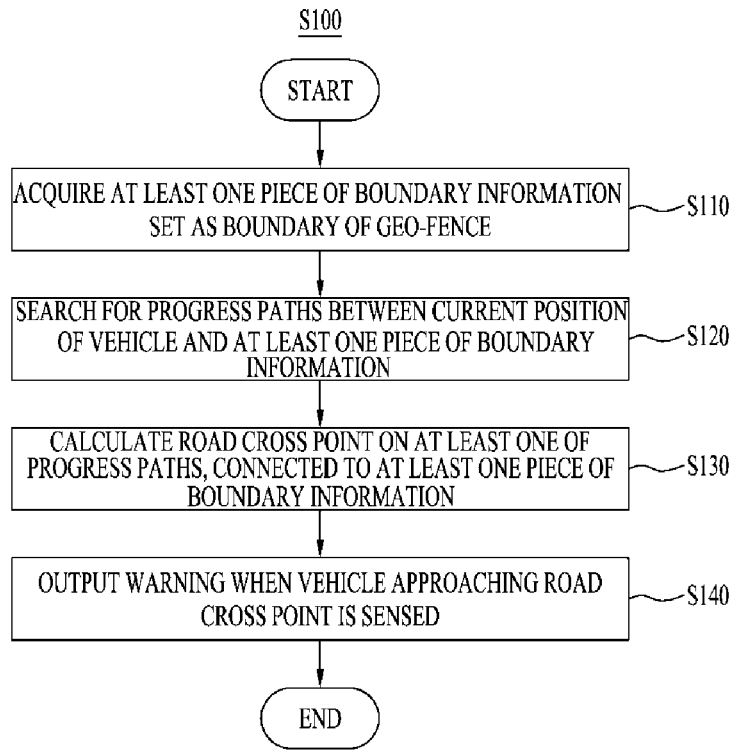
FIG. 1 is a flowchart illustrating one example of a safe driving inducement method in accordance with embodiments of the present disclosure.

Reference will now be made in detail to the embodiments of the present disclosure, examples of which are illustrated in the accompanying drawings. In the drawings, the same or similar elements are denoted by the same reference numerals even though they are depicted in different drawings.

Terms used in the following description are defined taking into consideration the functions obtained in accordance with the present disclosure. For example, it may be understood that singular expressions used in description of the various embodiments and the accompanying claims may include plural expressions unless they have apparently different meanings. Further, it may be understood that a term "and/or" used in the following description includes all arbitrary and all possible combinations of one or more of relevant items which are listed.

Moreover, terms "boundary information" and "road cross point" described in the following description are terms to name several positional areas of a geo-fence set on a map and are implemented by a navigation terminal or a navigation server.

The navigation terminal serves to provide search of vehicle paths from an origin to a destination using position information of a vehicle received from a positioning system, such as a GPS, a GPS system or a positioning server connected to the navigation terminal by a wireless network, search of geo-fence related paths and search of road cross points connected proximate to boundary points of a geo-fence.

In geo-fence related path search, in order to prevent a driving vehicle from deviating from a boundary range of a geo-fence, if the driving vehicle approaches a road cross point nearest to a boundary point of the geo-fence, a primary warning is issued and assists a driver to safely drive within the geo-fence range.

Further, if the navigation terminal executes setting related to the geo-fence, the navigation server may execute whether or not the driver violates the geo-fence and estimation/calculation of a violation possibility on a map based on setting of the geo-fence and provides a result of estimation/calculation of the violation possibility to the navigation terminal.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one control unit. The term "control unit" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the control unit in conjunction with one or more other components, as would be appreciated by a person of ordinary skill in the art.

Hereinafter, whether or not a vehicle violates a geo-fence and estimation/calculation of a violation possibility will be described in more detail through embodiments.

<One Example of Safe Driving Inducement Method>

Figure 2:
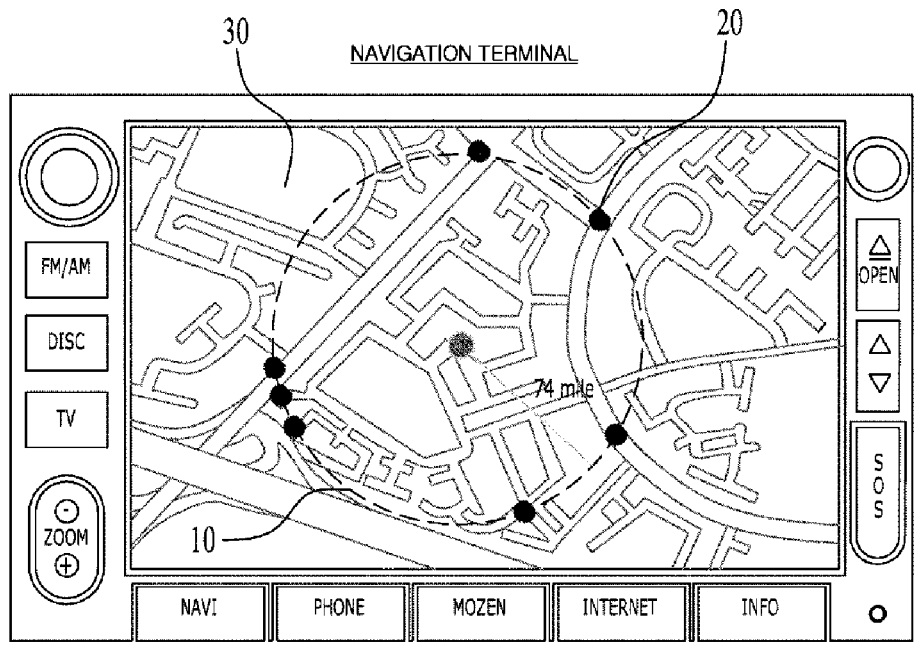
FIGS. 2 to 5 are views illustrating the state of a geo-fence mapped on a map by applying an algorithm related to the geo-fence to the map.
Figure 3:
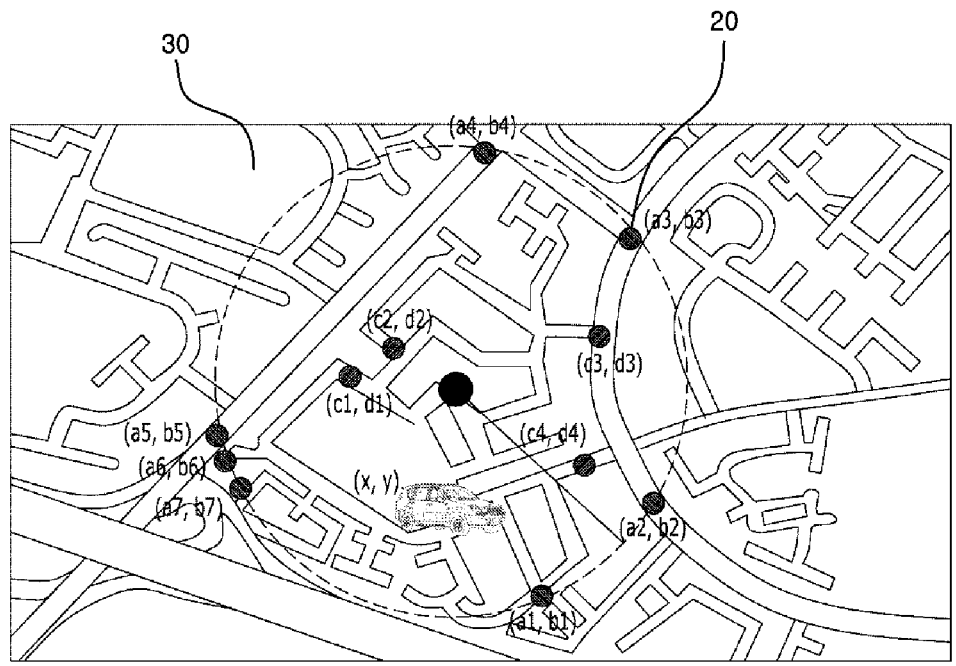

FIG. 1 is a flowchart illustrating one example of a safe driving inducement method in accordance with embodiments of the present disclosure and FIGS. 2 and 3 are views illustrating a geo-fence state of a navigation terminal for executing the safe driving inducement method of FIG. 1. Here, in addition to FIGS. 2 and 3, FIGS. 4 and 5 are supplementarily used to describe FIG. 1.

As exemplarily shown in the figures, in a safe driving inducement method in accordance with embodiments, a navigation service, for example, a map service related to road guidance, is executed by a navigation terminal.

The map service includes not only guidance of a road path through a map but also preliminary detection as to whether or not a vehicle approaches the boundary region of a geo-fence set on the map so as to induce safe driving of the vehicle within the range of the set geo-fence. Such a map service is executed by the navigation terminal and is displayed on a display screen of the navigation terminal.

Here, the safe driving inducement method includes Operations S110 to S140 so as to execute the above-described preliminary detection of the geo-fence through the navigation terminal.

First, in accordance with embodiments, in Operation S110, the navigation terminal acquires at least one piece of boundary information by confirming the boundary of a geo-fence set on a map. A process of acquiring at least one piece of boundary information may include storing the at least one piece of boundary information set as the boundary of the geo-fence within the navigation terminal and extracting the at least one piece of boundary information stored within the navigation terminal, as needed.

The at least one boundary information may include road boundary information located at a boundary point of the geo-fence and geographical boundary information set to neighbor to the road boundary information.

For example, as exemplarily shown in FIG. 2, if a geo-fence 10 set on a map has a circular shape, when several roads are located at boundary points along the circular geo-fence 10 and terrain features, for example, buildings, mountains, rivers and the like, are located adjacent to the roads, the several roads located at the boundary points may be set as road boundary information 20 and stored in the navigation terminal and the terrain features on which vehicles may not travel may be set as geographical boundary information 30 and stored in the navigation terminal.

Boundary information may mean position coordinate values including latitude and longitude corresponding to a boundary point of the geo-fence 10.

In this case, in Operation S110 above, coordinate values of boundary information including the road boundary information 20 and the geographical boundary information 30 may be stored and only coordinate values of the road boundary information 20 may be extracted from the stored boundary information and used for path search which will be described later.

However, the above-described geo-fence 10 is not limited to the circular shape and may be set to have various shapes by a user and/or a driver and set to have an irregular shape according to terrain features and road circumstances.

In accordance with embodiments, in Operation S120, the driver searches for the current position of his/her vehicle displayed on the map during driving of the vehicle through the navigation terminal. Further, in Operation S120, the navigation terminal may search for progress paths between the at least one boundary information acquired in Operation S110 and the searched current position of the vehicle.

In more detail, in Operation S120, progress paths between the current position of the vehicle and the extracted road boundary information 20 out of the boundary information are searched for.

For example, as exemplarily shown in FIG. 3, all progress paths, such as progress paths from the current position (x, y) of the vehicle 40 to coordinates (a1, b1) of the road boundary information 20, progress paths from the current position (x, y) to coordinates (a2, b2), progress paths from the current position (x, y) to coordinates (a3, b3), progress paths from the current position (x, y) to coordinates (a4, b4) and the like, may be searched for through the navigation terminal.

However, in Operation S120, all progress paths are not searched for and some progress paths between the position of the vehicle and pieces of the road boundary information having high priorities of proximity to the position of the vehicle may be searched for through the navigation terminal.

For example, as exemplarily shown in FIG. 3, by selecting the road boundary information 20 of the coordinates (a1, b1) and the road boundary information 20 of the coordinates (a2, b2) having high priorities of proximity to the current position (x, y) of the vehicle 40, progress paths from the current position (x, y) of the vehicle 40 to the coordinates (a1, b1) and progress paths from the current position (x, y) to the coordinates (a2, b2) may be searched for through the navigation terminal.

Further, in accordance with embodiments, by selecting only the road boundary information 20 connected directly to a road, on which the vehicle 40 travels, except for the road boundary information 20 not connected directly to the road, on which the vehicle 40 travels, progress paths from the position of the vehicle and the pieces of the road boundary information 20 may be searched for through the navigation terminal.

For example, as exemplarily shown in FIG. 3, only the road boundary information 20 of the coordinates (a1, b1) connected directly to the road having the position (x, y) of the vehicle 40 and the road boundary information 20 of the coordinates (a2, b2) connected directly to the road having the position (x, y) of the vehicle 40 may be searched for through the navigation terminal.

Herein, it is assumed that remaining pieces of the road boundary information 20 are boundary points of the geo-fence 10 which are not connected directly to the road on which the driving vehicle 40 travels.

The reason for search of a small number of progress paths is that, since there are a large number of paths from the current position of the vehicle 40 to at least one piece of road boundary information 20 located at the boundary point of the geo-fence 10, search of only a small number of pieces of road boundary information 20 connected to the road on which the vehicle 40 travels within a restricted display range is more realistic.

In accordance with embodiments, in Operation S130, the navigation terminal calculates a road cross point of at least one progress path searched in Operation S210 connected to arbitrary boundary information, for example, the road boundary information 20, based on a degree of proximity of the at least one searched progress to the arbitrary boundary information.

For example, if a progress path from the current position (x, y) of the vehicle 40 to the road boundary information 20 (a1, b1) of an arbitrary boundary point is searched for, as exemplarily shown in FIG. 3, the position of an arbitrary road cross point (c4, d4) may be calculated based on a degree of proximity of the searched progress path to road boundary information. The positions of remaining road cross points (c1, d1), (c2, d2) and (c3, d3) shown in FIG. 3 may be calculated through the above-described method.

That is, the calculated road cross point may mean the first cross road extending inwardly from the road boundary information 20. This means that one road cross point is mapped to each piece of the road boundary information 20.

However, the present disclosure is not limited thereto and an arbitrary piece of road boundary information 20 may include a plurality of road cross points according to entering directions of the vehicle 40.

Finally, in accordance with embodiments, in Operation S140, the navigation terminal may preliminarily output (i.e., issue) a warning to prevent the vehicle 40 from driving towards the boundary point of the geo-fence 10 by sensing the vehicle 40 approaching the road cross point, calculated in Operation S130, on the map before the vehicle 40 enters the road cross point.

In more detail, in Operation S140, if a distance between the current position of the vehicle 40 and the road cross point is within a predetermined distance range, this case is regarded as a risk state in which the vehicle 40 may drive toward an arbitrary boundary point of the geo-fence and the navigation terminal outputs a warning corresponding to such a risk state.

Entrance of the vehicle 40 into the distance range may be confirmed through calculation of a distance indicating a degree of approach between the current position of the vehicle 40 and the position of the road cross point based on the current position of the vehicle 40 and the position of the road cross point, and the output warning may be at least one of warning text (alarm text) displayed on the road on which the vehicle 40 travels on the map and a voice warning outputted through a speaker of the navigation terminal.

Accordingly, the driver may confirm the warning text (i.e., alarm text) displayed on the map of the navigation terminal and/or the voice warning outputted through the speaker and thus prevent the vehicle 40 from entering the boundary region of the geo-fence 10 set by the user, thus inducing safe driving.

Figure 4:
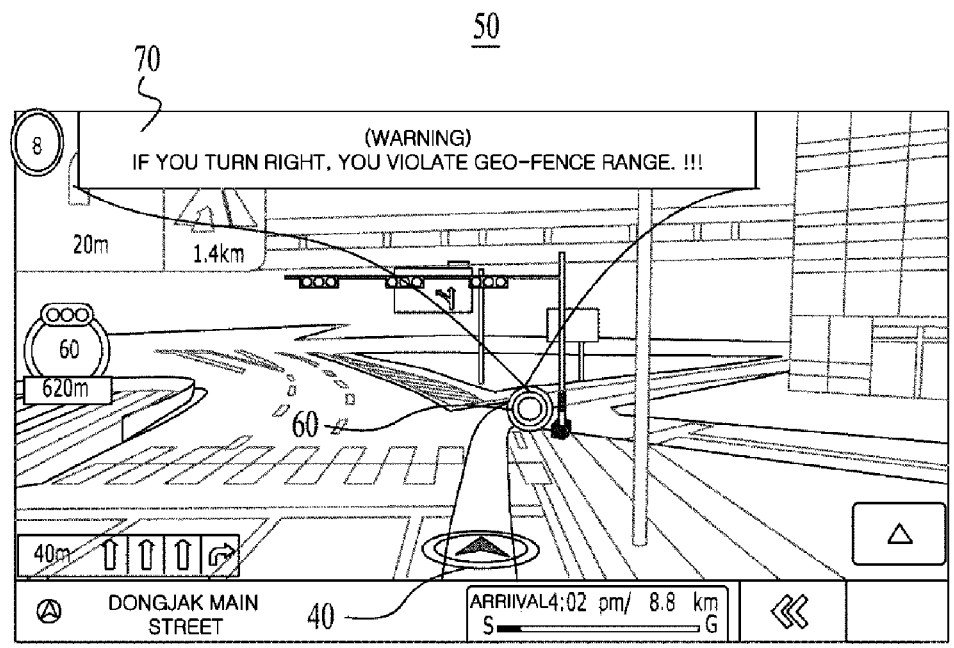
Figure 5:
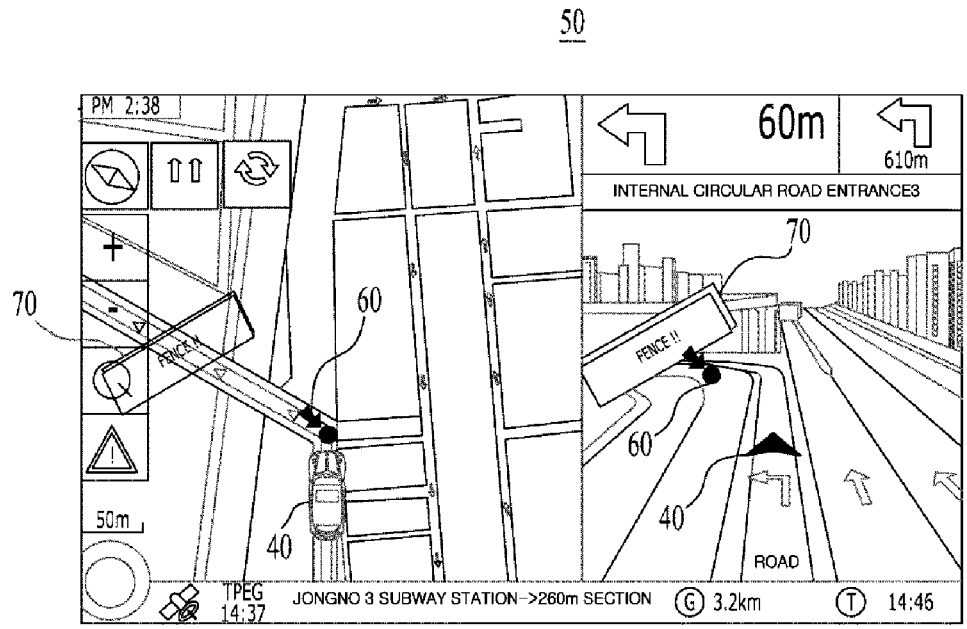

Here, FIGS. 4 and 5 illustrate examples of the warning text (i.e., alarm text) displayed on a display screen of the navigation terminal. A display screen 50 of the navigation terminal shown in FIG. 5 may display a warning message 70 "If you turn right, you violate a geo-fence range. !!", if the vehicle 40 driving on a road in the road driving mode of the map approaches a pre-calculated arbitrary road cross point 60.

The road driving mode may display only the above-described warning message 70 but also additional information, such as a vehicle driving direction, a road state, a vehicle velocity and the like.

On the other hand, a display screen 50 of the navigation terminal shown in FIG. 5 may display two types of road driving modes. The two types of road driving modes may display a driving vehicle, a road state, a driving direction, a road cross point 60 and warning text (alarm text; for example, an alarm message "FENCE"). Therefore, the driver may directly confirm the warning message during driving through the map of FIG. 4 or 5 and prevent the vehicle from entering the boundary range of the geo-fence.

The above-described embodiments may be implemented in program commands executed through various computer components and stored in a computer readable recording medium. Such a recording medium may be a ROM, a magnetic disk or a compact disc, but is not limited thereto.

<One Example of Navigation Terminal>

Figure 6:
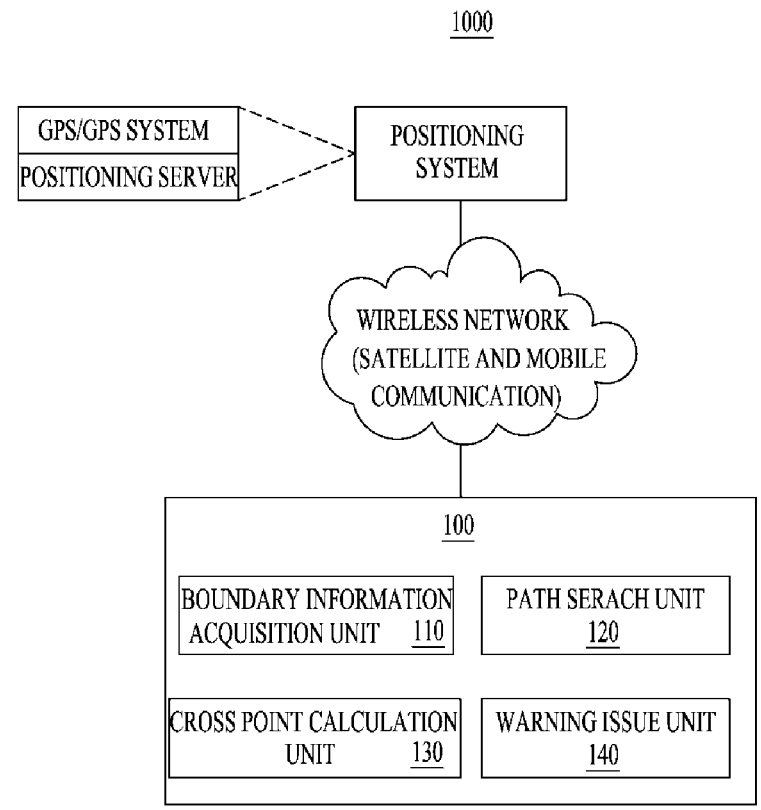
FIG. 6 is a block diagram illustrating one example of a navigation terminal in accordance with embodiments of the present disclosure.

FIG. 6 is a block diagram illustrating one example of a navigation terminal in accordance with embodiments of the present disclosure.

As shown in FIG. 6, a navigation terminal 100 in accordance with embodiments provides search of vehicle paths from an origin to a destination using position information of a vehicle received from a positioning system, such as a GPS, a GPS system or a positioning server connected to the navigation terminal by a wireless network (e.g., satellite communication network or a mobile communication network), search of geo-fence related paths and search of road cross points connected proximate to boundary points of a geo-fence.

For this purpose, the navigation terminal 100 includes a boundary information acquisition unit 110, a path search unit 120, a cross point calculation unit 130 and a warning issue unit 140. Here, in order to describe FIG. 6, FIGS. 2 to 5 will be supplementarily referred to.

First, in accordance with embodiments, the boundary information acquisition unit 110 may acquire at least one piece of boundary information indicating a boundary point of a geo-fence displayed on a map. FIG. 2 illustrates the at least one piece of boundary information. The boundary information shown in FIG. 2 may include road boundary information 20 located at boundary points of the geo-fence 10 and geographical boundary information 30 set to neighbor to the road boundary information 20.

The road boundary information 20 indicates one boundary position set on a road passing through a boundary point and the geographical boundary information 30 indicates a boundary position of the geo-fence 10 with respect to a terrain feature on which vehicles may not travel. The acquired boundary information may be represented by coordinate values including latitude and longitude corresponding to the boundary point of the geo-fence 10.

Therefore, the boundary information acquisition unit 110 may acquire coordinate values of boundary information including the road boundary information 20 and the geographical boundary information 30, extract only coordinate values of the road boundary information 20 from the acquired boundary information, and use the extracted coordinate values of the road boundary information 20 to judge whether or not a vehicle approaches a boundary region of the geo-fence 10.

Although the above-described geo-fence 10 may be set to have a circular shape, as exemplarily shown in FIG. 2 the geo-fence 10 is not limited to the circular shape and may be set to have various shapes by a user and/or a driver and set to have an irregular shape according to terrain features and road circumstances.

In accordance with embodiments, the path search unit 120 may search for the current position of a driver's vehicle displayed on the map during driving. Further, after search of the current position of the vehicle, the path search unit 120 may search for progress paths between the current position information regarding the searched current position of the vehicle and the at least one acquired piece of boundary information.

In more detail, the path search unit 120 may search for progress paths between the current position of the vehicle and road boundary information out of the extracted boundary information.

For example, as exemplarily shown in FIG. 3, the path search unit 120 may search for all progress paths, such as progress paths from the current position (x, y) of the vehicle 40 to coordinates (a1, b1) of the road boundary information 20, progress paths from the current position (x, y) to coordinates (a2, b2), progress paths from the current position (x, y) to coordinates (a3, b3), progress paths from the current position (x, y) to coordinates (a4, b4) and the like.

However, in accordance with embodiments, the path search unit 120 may not search for all of the above-described progress paths but may search for a small number of progress paths between the position of the vehicle and pieces of the road boundary information having high priorities of proximity to the position of the vehicle.

For example, as exemplarily shown in FIG. 3, the path search unit 120 may select the road boundary information of the coordinates (a1, b1) and the road boundary information 20 of the coordinates (a2, b2) having high priorities of proximity to the current position (x, y) of the vehicle 40 and search for progress paths from the current position (x, y) of the vehicle 40 to the coordinates (a1, b1) and progress paths from the current position (x, y) to the coordinates (a2, b2).

Further, in accordance with embodiments, the path search unit 120 may select only pieces of the road boundary information 20 connected directly to a road, on which the vehicle 40 travels, except for pieces of the road boundary information 20 not connected directly to the road and search for progress paths from the position of the vehicle and the selected pieces of the road boundary information 20.

For example, as exemplarily shown in FIG. 3, the path search unit 120 may search for a piece of the road boundary information 20 of the coordinates (a1, b1) connected directly to the road having the position (x, y) and a piece of the road boundary information 20 of the coordinates (a2, b2) connected directly to the road having the position (x, y).

Herein, it is assumed that remaining pieces of the road boundary information 20 are boundary points of the geo-fence 10 which are not connected directly to the road on which the driving vehicle 40 travels.

The reason for search of a small number of progress paths is that, since there are a large number of paths from the current position of the vehicle 40 to at least one piece of road boundary information 20 located at the boundary point of the geo-fence 10, search of only a small number of pieces of road boundary information 20 connected to the road on which the vehicle 40 travels within a restricted display range is more realistic.

In accordance with embodiments, the cross point calculation unit 130 calculates a road cross point connected to boundary information, for example, the road boundary information 20, based on a degree of proximity of the at least one progress path searched in Operation S120 to arbitrary boundary information.

For example, the cross point calculation unit 130, if a progress path from the current position (x, y) of the vehicle 40 to the road boundary information 20 (a1, b1) of an arbitrary boundary point is searched for, as exemplarily shown in FIG. 3, may calculate the position of an arbitrary road cross point (c4, d4) based on a degree of proximity of the searched progress path to road boundary information. The positions of remaining road cross points (c1, d1), (c2, d2) and (c3, d3) shown in FIG. 3 may be calculated through the above-described method.

That is, the calculated road cross point may mean the first cross road extending inwardly from the road boundary information 20. This means that one road cross point is mapped to each piece of the road boundary information 20.

However, the present disclosure is not limited thereto and an arbitrary piece of road boundary information 20 may include a plurality of road cross points according to entering directions of the vehicle 40.

Finally, in accordance with embodiments, the warning issue unit 140 may preliminarily output (i.e., issue) a warning to prevent the vehicle from driving towards the boundary point of the geo-fence 10 by sensing the vehicle approaching the road cross point on the map before the vehicle 40 enters the road cross point.

In more detail, the warning issue unit 140, if a distance between the current position of the vehicle and the road cross point is within a predetermined distance range, regards this case as a risk state in which the vehicle 40 may drive toward the arbitrary boundary point of the geo-fence and output a warning corresponding to such a risk state.

Entrance of the vehicle into the distance range may be confirmed through calculation of a distance indicating a degree of approach between the current position of the vehicle and the position of the road cross point based on the current position of the vehicle and the position of the road cross point and the output warning may be at least one of warning text (i.e., alarm text) displayed on the road on which the vehicle 40 drives on the map and a voice warning outputted through a speaker of the navigation terminal.

FIGS. 4 and 5 illustrate examples of the warning text (i.e., alarm text) displayed on a display screen of the navigation terminal 100. This has been sufficiently described above in FIG. 1 and a detailed description thereof will thus be omitted.

Accordingly, the driver may confirm the warning text displayed on the map of the navigation terminal and/or the voice warning outputted through the speaker and thus prevent the vehicle from entering the boundary region of the geo-fence set by the user, thus inducing safe driving.

<Another Example of Navigation Terminal>

Figure 7:
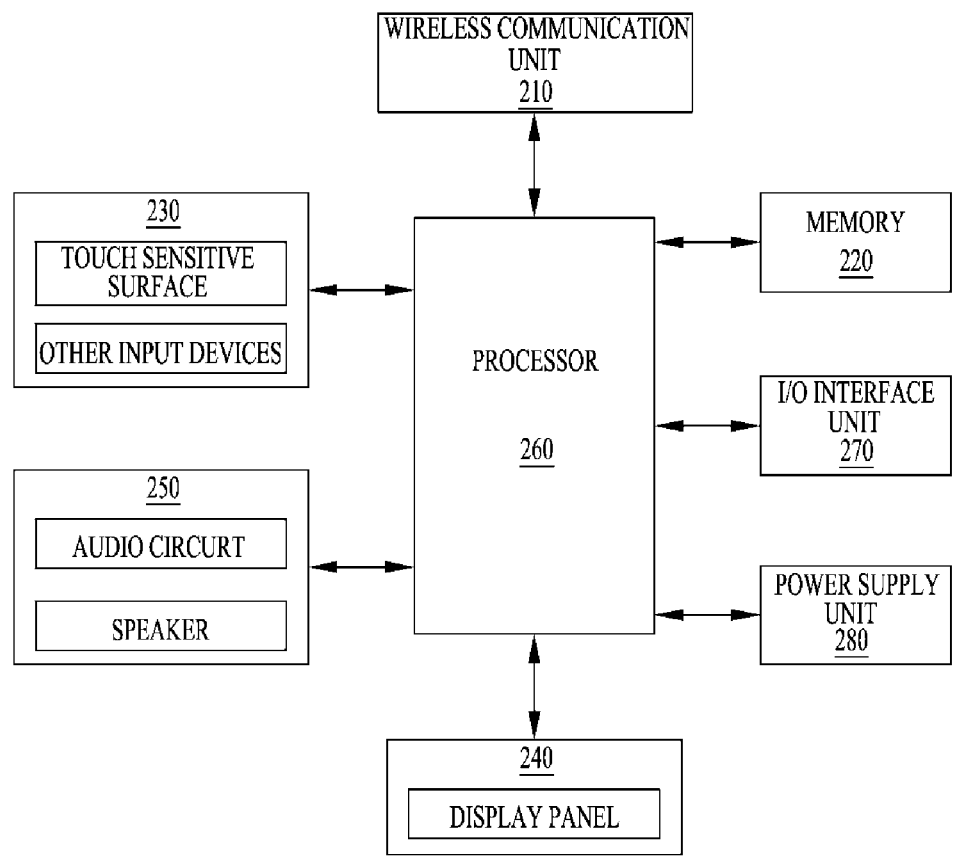
FIG. 7 is a block diagram illustrating the structure of a navigation terminal in accordance with embodiments of the present disclosure in more detail.

FIG. 7 is a block diagram illustrating the structure of a navigation terminal in accordance with embodiments of the present disclosure in more detail.

As shown in FIG. 7, a navigation terminal in accordance with embodiments processes the method for issuing a warning when a vehicle approaches a road cross point set to be proximate to the geo-fence region described in FIGS. 1 to 5.

For this purpose, the navigation terminal includes a wireless communication unit 210, a memory 220 including at least one computer readable recording medium, an input unit 230, a display unit 240, an output unit 250, a processor 260 to process at least one core, an I/O interface 270, and a power supply unit 280.

The wireless communication unit 210 is connected to a GPS through a wireless network so as to gather position data, required to provide a map service from the GPS, in real-time.

The memory 220 refers to a module to store the safe driving inducement method for issuing a warning when a vehicle approaches a road cross point set to be proximate to the geo-fence region, described in FIGS. 1 to 5. For example, the memory 220 may store a program in which the safe driving inducement method, including acquiring at least one piece of boundary information set as the boundary of the geo-fence on a map, searching for at least one progress path between the current position of the vehicle displayed on the map and the at least one piece of boundary information, calculating a road cross point on the at least one searched progress path, which is connected to the at least one piece of boundary information, and outputting a warning before the vehicle enters the road cross point, is encoded. The memory 220 may include a high speed random access memory (RAM), for example, at least one non-volatile memory, such as a magnetic disc memory or a flash memory, or solid state drive (SSD) memory. Further, the memory 220 may include a memory controller so that the processor 260 and the input unit 230 may access the memory 220.

The input unit 230 receives input of number or character information and generates signal input regarding user setting and function control by a keyboard, a mouse, a joystick, an optic ball or a track ball.

Such an input unit 230 may include a touch sensitive surface 231 and other input devices 232. The touch sensitive surface 231 is referred to as a 'touch panel' or a 'touch pad', and may gather user's touch operations thereon or an area adjacent thereto (e.g., user's operations of touching the touch sensitive surface 231 or an area adjacent to the touch sensitive surface 231 using an arbitrary proper object or accessory, such as user's fingers or a touch pen) and simultaneously drive a related device connected thereto according to a predetermined program.

The touch sensitive surface 231 may include at least one of a touch detection unit and a touch controller. The touch detection unit simultaneously detects a user's touch position and a signal due to touch operation and transmits touch information to the touch controller. The touch controller receives the touch information from the touch detection unit, converts the corresponding information into contact point coordinates, and simultaneously transmits the contact point coordinates to the processor 260 and receives a command from the processor 260 to execute the command.

Further, the touch sensitive surface 231 may be implemented in various types, such as a resistance type, a capacitance type and a surface acoustic wave type. The input unit 230 may further include other input devices 232 in addition to the touch sensitive surface 231. The input devices 232 may include at least one of a physical keyboard, function keys (e.g., a volume button, a switch button, etc.), a track ball, a mouse and a joystick but is not limited thereto.

The display unit 240 serves to display user input information or information provided to a user and various graphical user interfaces (GUIs) of the navigation terminal 200, and the GUIs may include figures, text, icons, video and an arbitrary combination thereof.

The display unit 240 may include a display panel 241. The display panel 241 may be one of a liquid crystal display (LCD) and an organic light-emitting diode (OLED). The touch sensitive surface 231 and the display panel 241 may be two independent elements executing output and input functions or be integrated into one body so as to execute both input/output functions.

In order to output a generated voice warning corresponding to issue of a warning processed by the processor 260, the output unit 250 may include an audio circuit 251 to process voice information regarding the voice warning and a speaker 252 to output the voice information.

The processor 260 which is a control center of the navigation terminal 200 is connected to the respective parts via various interfaces and circuits. The processor 260 executes or operates software programs and/or modules stored in the memory 220, and performs execution of various functions of the navigation terminal 200 and data processing through retrieval of data stored in the memory 220.

The above-described software program may refer to a result of encoding of the safe driving inducement method described in FIGS. 1 to 5 and the modules may refer to the respective elements of the navigation terminal described in FIGS. 2 to 6.

For example, the processor 260 in accordance with embodiments may encode and execute a safe driving inducement method including acquiring at least one piece of boundary information set as the boundary as a geo-fence on a map, searching for at least one progress path between the current position of a vehicle displayed on the map and the at least one piece of boundary information, calculating the position of a road cross point of the at least one searched progress path, connected to the at least one piece of boundary information based on a degree of proximity of the at least one searched progress path to arbitrary road boundary information, and outputting a warning when the vehicle approaching the road cross point is sensed.

Such a processor 260 may include one core or a plurality of cores. For example, an operation processor to process the safe driving inducement method described in FIGS. 1 to 4 and a modem processor may be integrated. The operation processor mainly processes OSs, user interfaces and the safe driving inducement method and the modem processor mainly processes wireless communication. However, the modem processor may not be integrated with the processor 260.

The I/O interface unit 270 supports an I/O interface so that corresponding data may be smoothly transmitted between the above-described input unit 230 and/or output unit 250 and the processor 260.

Finally, the power supply unit 280 may supply power to the above-described respective elements, be logically connected to the processor 260 through a power management system and execute charging and discharging management and power management through the power management system.

Such a power supply unit 280 may include at least one DC or AC power source, a recharge system, a power source failure detection circuit, a power converter or inverter, and a power state indicator.

<One Example of Navigation Server>

Figure 8:
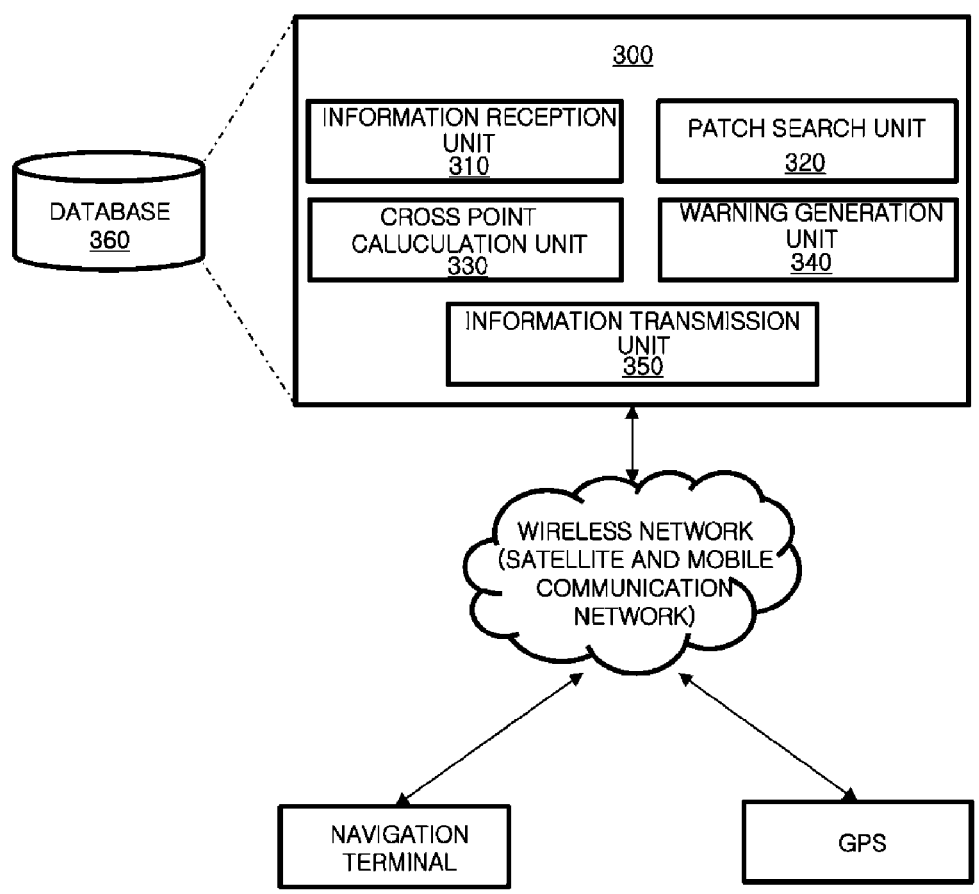
FIG. 8 is a block diagram illustrating one example of a navigation server in accordance with embodiments of the present disclosure.

FIG. 8 is a block diagram illustrating one example of a navigation server in accordance with embodiments of the present disclosure. In order to describe FIG. 8, as a result of application of an algorithm regarding a geo-fence to a map, FIGS. 2 and 3 will be supplementarily referred to.

As shown in FIG. 8, a navigation server 300 in accordance with embodiments may include an information reception unit 310, a path search unit 320, a cross point calculation unit 330, a warning generation unit 340, an information transmission unit 350 and a database 360, in order to preliminarily detect whether or not a vehicle deviates from the boundary region of the geo-fence.

First, the information reception unit 310 receives at least one piece of boundary information set as the boundary of the geo-fence from a navigation terminal through a wireless network.

FIG. 2 illustrates the at least one received piece of boundary information. The boundary information shown in FIG. 2 may be displayed on the map and displayed on a display screen of the navigation terminal. However, the map including the boundary information displayed on the display screen may be implemented by the navigation server and displayed on the display screen of the navigation terminal.

The boundary information shown in FIG. 2 may include road boundary information 20 located at boundary points of the geo-fence 10 and geographical boundary information 30 set to neighbor to the road boundary information 20.

The road boundary information 20 indicates one boundary position set on a road passing through a boundary point of the geo-fence 10 and the geographical boundary information 30 indicates a boundary position of the geo-fence 10 with respect to a terrain feature on which vehicles may not travel.

The acquired boundary information may be represented by coordinate values including latitude and longitude corresponding to the boundary point of the geo-fence 10.

Further, the information reception unit 310 may receive the current position of the driving vehicle in real-time from the GPS and map the received current position together with the boundary information on the map. Here, in addition to the current position of the vehicle and the boundary information, a result of mapping on the map may be stored in the database 360.

Although the above-described geo-fence 10 shown in FIG. 2 may be set to have a circular shape, the geo-fence 10 is not limited to the circular shape and may be set to have various shapes by a user and/or a driver and set to have an irregular shape according to terrain features and road circumstances.

In accordance with embodiments, the path search unit 320 may search for progress paths between the current position of the vehicle and at least one piece of boundary information displayed on the map using the result of mapping stored in the database 360.

For example, as exemplarily shown in FIG. 3, the path search unit 130 may search for all progress paths, such as progress paths from the current position (x, y) of the vehicle 40 to coordinates (a1, b1) of the road boundary information 20, progress paths from the current position (x, y) to coordinates (a2, b2), progress paths from the current position (x, y) to coordinates (a3, b3), progress paths from the current position (x, y) to coordinates (a4, b4) and the like.

However, in accordance with embodiments, the path search unit 320 may not search for all of the above-described progress paths but may search for a small number of progress paths between the position of the vehicle and pieces of the road boundary information having high priorities of proximity to the position of the vehicle.

For example, as exemplarily shown in FIG. 3, the path search unit 320 may select the road boundary information of the coordinates (a1, b1) and the road boundary information 20 of the coordinates (a2, b2) having high priorities of proximity to the current position (x, y) of the vehicle and search for progress paths from the current position (x, y) to the coordinates (a1, b1) and progress paths from the current position (x, y) to the coordinates (a2, b2).

Further, in accordance with embodiments, the path search unit 320 may select only pieces of the road boundary information 20 connected directly to a road, on which the vehicle travels, except for pieces of the road boundary information 20 not connected directly to the road and search for progress paths from the position of the vehicle and the selected pieces of the road boundary information 20.

For example, as exemplarily shown in FIG. 3, the path search unit 320 may search for only a piece of the road boundary information 20 of the coordinates (a1, b1) connected directly to the road having the position (x, y) and a piece of the road boundary information 20 of the coordinates (a2, b2) connected directly to the road having the position (x, y).

Herein, it is assumed that remaining pieces of the road boundary information 20 are boundary points of the geo-fence 10 which are not connected directly to the road on which the driving vehicle 40 travels.

The reason for search of a small number of progress paths is that, since there are a large number of paths from the current position of the vehicle 40 to at least one piece of road boundary information 20 located at the boundary point of the geo-fence 10, search of only a small number of pieces of boundary information, for example, the road boundary information 20, connected to the road on which the vehicle 40 travels within a restricted display range may reduce the number of tracked data and thus improve a tracking speed.

The cross point calculation unit 330 calculates a road cross point connected to boundary information, for example, the road boundary information 20, based on a degree of proximity of the at least one searched progress path to arbitrary boundary information.

For example, the cross point calculation unit 330, if the progress path from the current position (x, y) of the vehicle 40 to the road boundary information 20 (a1, b1) of an arbitrary boundary point is searched for, as exemplarily shown in FIG. 3, may calculate the position of an arbitrary road cross point (c4, d4) based on a degree of proximity of the searched progress path to road boundary information.

The positions of remaining road cross points (c1, d1), (c2, d2) and (c3, d3) shown in FIG. 3 may be calculated through the above-described method. That is, the calculated road cross point may mean the first cross road extending inwardly from the road boundary information 20. This means that one road cross point is mapped to each piece of the road boundary information 20.

However, the present disclosure is not limited thereto and an arbitrary piece of road boundary information 20 may include a plurality of road cross points according to entering directions of the vehicle 40.

The warning generation unit 340, when the position of the vehicle approaching the road cross point, calculated by the cross point calculation unit 330, on the map is sensed before the vehicle enters the road cross point, generates warning information.

In more detail, the warning generation unit 340, if a distance between the current position of the vehicle mapped on the map and the road cross point is within a predetermined distance range, regards this case as a risk state in which the vehicle 40 may drive toward the arbitrary boundary point of the geo-fence and thus preliminarily generate warning information corresponding to such a risk state.

Entrance of the vehicle into the distance range may be confirmed through calculation of a distance indicating a degree of approach between the current position of the vehicle and the position of the road cross point based on the current position of the vehicle and the position of the road cross point, and the output warning generated thereby may include warning text (alarm text). The warning text may be formed in one of types 70 shown in FIGS. 4 and 5.

The information transmission unit 350 may transmit the boundary information mapped on the map by the above-described elements, the current position of the vehicle, the progress paths and the road cross points to the navigation terminal through the wireless network in real-time.

Further, when the warning is issued, the information transmission unit 350 may transmit the generated warning information to the navigation terminal.

Thereby, a driver of the vehicle may confirm the warning text (i.e., alarm text) displayed on the map of the navigation terminal and prevent the vehicle from entering the boundary region of the geo-fence set by a user, thus assisting the driver to safely drive the vehicle.

Finally, the database 360 serves to store data acquired or processed by the above-described elements. Such a database 360 conceptually includes a computer readable recording medium, and may include not only a database in the narrow sense but also a database in the broad sense including data records based on a file system. If data may be extracted from a group of logs, the group of logs may fall within the category of the database in the present disclosure.

As apparent from the above description, a safe driving inducement system in accordance with one embodiment does not notify of violation details after violation in a geo-fence service but prevents position violation through a preliminary alarm, thus assisting a driver to safely drive his/her vehicle.

Further, the safe driving inducement system informs of the nearest cross road extending from a road located at the boundary region of the geo-fence and prevents a vehicle from entering the boundary region of the geo-fence, thus assisting the driver to safely drive his/her vehicle.

Moreover, the safe driving inducement system displays information related to the nearest cross road on a map through warning text or an alarm (a flickering warning), thus preliminarily preventing a vehicle from entering the boundary region of the geo-fence.

It will be apparent to those skilled in the art that various modifications and variations can be made in the present disclosure without departing from the spirit or scope of the disclosure. Thus, it is intended that the present disclosure covers the modifications and variations of this disclosure provided they come within the scope of the appended claims and their equivalents.

What is claimed is:

1. A navigation terminal for a vehicle comprising:
  a boundary information acquisition unit acquiring at least one piece of boundary information, representing a boundary of a geo-fence, on a map;
  a path search unit searching for progress paths between a current position of the vehicle displayed on the map and extracted road boundary information among the at least one piece of boundary information having a highest priority of proximity to the current position of the vehicle;
  a cross point calculation unit calculating a road cross point on at least one identified progress path, connected to the at least one piece of boundary information, based on a degree of proximity of the at least one identified progress path to the at least one piece of boundary information; and
  a warning issue unit outputting a warning when it is sensed that the vehicle is approaching the calculated road cross point, wherein
  the warning is a preliminary warning that is issued before the vehicle deviates from the boundary of the geo-fence, and
  the at least one piece of boundary information is located on a road connected directly to the current position of the vehicle.

2. The navigation terminal according to claim 1, wherein the boundary information includes road boundary information passing through boundary points of the geo-fence and geographical boundary information neighboring the road boundary information.

3. The navigation terminal according to claim 2, wherein the boundary information acquisition unit includes:
  a boundary information storage unit storing the boundary information including the road boundary information and the geographical boundary information; and
  a boundary information extraction unit extracting the road boundary information from the stored boundary information and outputting the extracted road boundary information to the path search unit.

4. The navigation terminal according to claim 1, wherein the cross point calculation unit calculates a first road cross point extending inwardly from the road boundary information.

5. The navigation terminal according to claim 4, wherein when a distance between the current position of the vehicle and the road cross point is within a predetermined distance range, the warning issue unit determines that a risk state exists and outputs the warning.

6. The navigation terminal according to claim 5, wherein the warning includes a message warning displayed on a road, on which the vehicle travels, on the map or a voice warning outputted through a speaker of the vehicle.

7. The navigation terminal according to claim 1, wherein each of the boundary information, the current position of the vehicle, and the road cross point includes coordinate values including latitude and longitude.

8. A navigation terminal for a vehicle comprising:
  a memory configured to store at least one program; and
  a processor configured to execute the at least one stored program,
  wherein when the processor executes the at least one stored program, the processor:
    acquires at least one piece of boundary information, representing a boundary of a geo-fence, on a map,
    searches for progress paths between a current position of the vehicle displayed on the map and extracted road boundary information among the at least one piece of boundary information having a highest priority of proximity to the current position of the vehicle,
    calculates a road cross point on at least one identified progress path, connected to the at least one piece of boundary information, based on a degree of proximity of the at least one identified progress path to the at least one piece of boundary information, and
    outputs a warning when it is sensed that the vehicle is approaching the calculated road cross point, and wherein
  the warning is a preliminary warning that is issued before the vehicle deviates from the boundary of the geo-fence, and
  the at least one piece of boundary information is located on a road connected directly to the current position of the vehicle.

9. A navigation server comprising:
  an information reception unit receiving at least one piece of boundary information, representing a boundary of a geo-fence, from a navigation terminal and receiving a current position of a vehicle from a global positioning system (GPS);
  a path search unit searching for progress paths between the current position of the vehicle displayed on a map and extracted road boundary information among the at least one piece of boundary information having a highest priority of proximity to the current position of the vehicle;
  a cross point calculation unit calculating a road cross point on at least one identified progress path, connected to the at least one piece of boundary information, based on a degree of proximity of the at least one identified progress path to the at least one piece of boundary information;
  a warning generation unit generating warning information when it is sensed that the vehicle is approaching the calculated road cross point; and
  an information transmission unit transmitting the at least one piece of boundary information, the current position of the vehicle, the at least one identified progress path, and the calculated road cross point to the navigation terminal in real-time by applying the at least one piece of boundary information, the current position of the vehicle, the at least one identified progress path, and the calculated road cross point to the map, and transmitting the generated warning information to the navigation terminal, wherein the warning information includes a preliminary warning that is issued before the vehicle deviates from the boundary of the geo-fence, and the at least one piece of boundary information is located on a road connected directly to the current position of the vehicle.

10. The navigation server according to claim 9, wherein the boundary information includes road boundary information passing through boundary points of the geo-fence and geographical boundary information neighboring the road boundary information.

11. The navigation server according to claim 10, wherein the cross point calculation unit calculates a first road cross point extending inwardly from the road boundary information.

12. The navigation server according to claim 11, wherein when a distance between the current position of the vehicle and the road cross point is within a predetermined distance range, the warning generation unit determines that a risk state exists and generates the warning.

* * * * *